(12) United States Patent
Packiarajan et al.

(10) Patent No.: US 9,994,084 B2
(45) Date of Patent: Jun. 12, 2018

(54) TRANSPORTATION REFRIGERATION BULKHEAD

(71) Applicant: THERMO KING CORPORATION, Minneapolis, MN (US)

(72) Inventors: Selvam Packiarajan, Eden Prairie, MN (US); John David Sweazey, Eden Prairie, MN (US); Tye Scott Sonney, Lakeville, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 91 days.

(21) Appl. No.: 14/409,273

(22) PCT Filed: Jun. 19, 2013

(86) PCT No.: PCT/US2013/046545
§ 371 (c)(1),
(2) Date: Dec. 18, 2014

(87) PCT Pub. No.: WO2013/192296
PCT Pub. Date: Dec. 27, 2013

(65) Prior Publication Data
US 2015/0165864 A1 Jun. 18, 2015

Related U.S. Application Data

(60) Provisional application No. 61/661,687, filed on Jun. 19, 2012.

(51) Int. Cl.
*F25D 19/02* (2006.01)
*B60H 1/32* (2006.01)
(Continued)

(52) U.S. Cl.
CPC ..... *B60H 1/00364* (2013.01); *B29C 44/1228* (2013.01); *B60H 1/3229* (2013.01);
(Continued)

(58) Field of Classification Search
CPC ............. B60H 1/00364; B60H 1/3229; B60H 1/3232; B60H 1/32; B60H 1/3226;
(Continued)

(56) References Cited

U.S. PATENT DOCUMENTS 2,735,277 A * 2/1956 Clark .................. B60H 1/3226
62/323.1
3,635,234 A * 1/1972 Dawson ................. F16K 13/04
137/68.21
(Continued)

OTHER PUBLICATIONS

International Search Report and Written Opinion for International Application No. PCT/US2013/046545, dated Sep. 25, 2013, 14 pgs.
(Continued)

*Primary Examiner* — Frantz Jules
*Assistant Examiner* — Martha Tadesse
(74) *Attorney, Agent, or Firm* — Hamre, Schumann, Mueller & Larson, P.C.

(57) ABSTRACT

A bulkhead for a transport refrigeration unit (TRU) is provided. The bulkhead is configured to create optimal air flow on both a front side (e.g. the side where the condenser unit is located) and a rear side (e.g. the side where the evaporator unit is located) of the bulkhead, provide structural support for various components of the TRU, and provide a thermal barrier between the front side and the rear side. Also, the bulkhead is configured to include an access door and a service opening that allows a user to access TRU components located on the rear side of the bulkhead via the front side of the bulkhead. Further, the rear side of the bulkhead is configured to provide a removal support shelf that can be used as a resting surface or a sliding surface for removing components located on the rear side of the bulkhead out of the TRU from the front side of the TRU via the service opening by removing the access door.

17 Claims, 12 Drawing Sheets

(51) Int. Cl.
*B60H 1/00* (2006.01)
*B29C 44/12* (2006.01)
*B62D 33/04* (2006.01)
B60P 3/20 (2006.01)
B29K 75/00 (2006.01)
B29L 9/00 (2006.01)

(52) U.S. Cl.
CPC ......... *B60H 1/3232* (2013.01); *B62D 33/048* (2013.01); *B29K 2075/00* (2013.01); *B29L 2009/00* (2013.01); *B60P 3/20* (2013.01); Y10T 29/49721 (2015.01)

(58) Field of Classification Search
CPC ..... B62D 33/048; B60P 3/20; B29C 44/1228; F25D 19/02; F25D 19/003
See application file for complete search history.

(56) References Cited

U.S. PATENT DOCUMENTS

| | | | |
|---|---|---|---|
| 3,672,349 A * | 6/1972 | Derringer | B60H 1/00364 126/110 AA |
| 3,704,926 A * | 12/1972 | Wariner | A47B 77/04 29/428 |
| 4,182,134 A * | 1/1980 | Viegas | F25D 19/003 62/298 |
| 4,206,784 A | 6/1980 | Phillips | |
| 4,257,240 A * | 3/1981 | Christiansen | B60H 1/3226 62/237 |
| 4,365,484 A * | 12/1982 | Carson | B60H 1/3226 62/239 |
| 4,402,191 A | 9/1983 | King | |
| 4,549,405 A | 10/1985 | Anderson et al. | |
| 4,551,986 A * | 11/1985 | Anderson | F25D 19/003 62/239 |
| 4,736,597 A * | 4/1988 | Anderson | F25D 19/003 62/239 |
| 4,770,002 A * | 9/1988 | Viegas | B60H 1/3226 415/61 |
| 4,802,342 A | 2/1989 | Gustafson et al. | |
| 5,123,257 A | 6/1992 | Anderson et al. | |
| 5,123,258 A | 6/1992 | Brown et al. | |
| 5,234,246 A | 8/1993 | Henigue et al. | |
| 5,369,957 A | 12/1994 | Hanson | |
| 5,605,055 A | 2/1997 | Salgado | |
| 5,769,704 A | 6/1998 | Henning et al. | |
| 5,993,310 A | 11/1999 | Onken | |
| 6,148,629 A * | 11/2000 | Boxum | B60H 1/00364 62/239 |
| 6,158,794 A * | 12/2000 | Flanagan | B60H 1/00364 296/24.35 |
| 6,217,102 B1 * | 4/2001 | Lathers | B60J 7/1614 296/100.07 |
| 6,289,684 B1 | 9/2001 | Guidry, II et al. | |
| 6,296,561 B1 * | 10/2001 | Ziegler | B60P 3/20 165/41 |
| 6,364,388 B1 * | 4/2002 | Ziegler | B60P 3/20 296/24.35 |
| 6,470,692 B1 | 10/2002 | Ziegler et al. | |
| 6,497,112 B1 * | 12/2002 | Simeone | F24F 1/0059 62/239 |
| 6,606,878 B1 | 8/2003 | Phillips et al. | |
| 6,669,555 B2 * | 12/2003 | Stauter | B60H 1/00471 165/122 |
| 6,931,884 B2 | 8/2005 | Kolda et al. | |
| 7,351,136 B2 | 4/2008 | Nelson et al. | |
| 7,578,534 B2 | 8/2009 | Wuerfel, III | |
| 8,181,476 B2 * | 5/2012 | Khan | B60P 3/20 62/244 |
| 8,870,638 B2 * | 10/2014 | Nelson | B60H 1/00364 454/118 |
| 2007/0095092 A1 | 5/2007 | Wuerfel, III | |
| 2009/0325476 A1 | 12/2009 | Clark | |
| 2010/0133290 A1 | 6/2010 | Luntz et al. | |

OTHER PUBLICATIONS

Supplementary European Search Report issued in corresponding European Application No. 13807594.0 dated May 18, 2017 (9 pages).

* cited by examiner

TRANSPORTATION REFRIGERATION BULKHEAD

FIELD

The embodiments disclosed herein relate generally to a transport refrigeration system (TRS). More particularly, the embodiments relate to a bulkhead for a TRS for use in a transport refrigeration unit (TRU).

BACKGROUND

Existing transport refrigeration systems are used to cool containers, trailers, railcars or other similar transport units (typically referred to as a "reefer"). Modern reefers are commonly used to transport perishable items such as produce and meat products. In such a case, the transport refrigeration systems are used to condition the air inside a cargo space of the transport unit, thereby maintaining desired temperatures and humidities during transportation or storage. Typically a TRU is attached to the transport unit to facilitate a heat exchange between the air inside the cargo space and the air outside of the transport unit.

SUMMARY

The embodiments described herein relate generally to a TRS. In particular, the embodiments described herein are directed to a bulkhead for a TRS for use in a TRU.

In particular, the embodiments described herein are directed to a bulkhead for use in a TRU that is configured to create optimal air flow on both a front side (e.g. the side where the condenser unit is located) and a rear side (e.g. the side where the evaporator unit is located) of the bulkhead, provide structural support for various components of the TRU, such as an air filter, a fuel filter, an evaporator blower, condenser blowers, an evaporator coil, condenser coils, etc., and provide a thermal barrier between the front side (e.g. the side where the condenser unit is located) and the rear side (e.g. the side where the evaporator unit is located). Also, the bulkhead is configured to include an access door and a service opening that allows a user to access TRU components (e.g. the evaporator unit) located on the rear side of the bulkhead via the front side of the bulkhead. Further, the rear side of the bulkhead is configured to provide a removal support shelf that can be used as a resting surface or a sliding surface for removing components (e.g., components of the evaporator unit) located on the rear side of the bulkhead out of the TRU from the front side of the TRU via the service opening by removing the access door.

With respect to the bulkhead, the contour of surfaces on an inner panel and an outer panel of the bulkhead are configured to create optimal air flows on a front side and a rear side of the bulkhead to facilitate optimal air flow return to a condenser unit and an evaporator unit.

Also, the outer panel and the inner panel are both made of materials that allow the bulkhead to provide structural support for other TRU components. In some embodiments, the outer and inner panels of the bulkhead are made of a sheet molding compound (SMC) material that can include long strands of glass fibers which impart rigidity and strength to the SMC material so as to provide sufficient strength to provide structural support for other TRU components.

Further, the bulkhead is also configured to provide a thermal barrier between the front side of the bulkhead and the rear side of the bulkhead, thereby providing a thermal barrier between an evaporator unit and a condenser unit, thereby reducing energy loss in the TRU. In some embodiments, the bulkhead includes an insulation layer between the outer and inner panels. The insulation layer can help to form the thermal barrier. The insulation layer can be made from two-part polyurethane foam.

In addition, the bulkhead also includes a service opening and an access door to close the service opening, allowing an evaporator unit located at the rear side of the bulkhead to be serviced from a front side of the bulkhead. The service opening and access door also allow components of the evaporator unit to be removed out from the service opening or reinstalled through the service opening.

Moreover, the bulkhead also includes a removal shelf at a rear side of the bulkhead that allows components located on the rear side of the bulkhead to rest or slide thereon during removal or reinstallation of the components of the TRU via the service opening.

With respect to the bulkhead, in some embodiments, a bulkhead includes a peripheral edge; and a center portion surrounded by the peripheral edge, the center portion being offset from a plane defined by the peripheral edge, defining a receiving space between the peripheral edge and a portion of the center portion that is most offset from the peripheral edge, wherein the receiving space is adapted to create optimal air flows on a front side and a rear side of the bulkhead to facilitate optimal air flow return to a condenser unit and an evaporator unit.

In some embodiments, a bulkhead includes an inner panel made from an SMC material; an outer panel made of the SMC material, where the outer panel generally tracks the contour of the inner panel. The SMC outer panel and inner panel include long strand of glass fibers which impart rigidity and strength to the SMC material, thereby allowing the bulkhead to provide structural support for other TRU components.

In some embodiments, a bulkhead includes an inner panel, and outer panel generally tracking the contour of the inner panel, and an insulation layer positioned between the outer and inner panels. The insulation layer can be formed by a two-part polyurethane foam. The insulation layer helps form a thermal barrier between an evaporator unit and a condenser unit, thereby preventing energy loss in the TRU effectively.

In some embodiments, a method of making the bulkhead for a TRU includes forming an inner panel made from a SMC material; forming an outer panel made from the SMC material, and injecting a two-part polyurethane foam between the outer panel and the inner panel to form an insulation layer, where the outer panel generally tracks the contour of the inner panel.

With respect to the access door, in some embodiments, a bulkhead includes a bulkhead body having a peripheral edge, and a center portion surrounded by the peripheral edge, where the center portion is offset from a plane defined by the peripheral edge; a service opening defined in the most offset portion of the center portion; and an access door that closes the service opening, wherein the access door is oriented parallel to the plane defined by the peripheral edge. The service opening and access door allows the evaporator unit located at the rear side of the bulkhead to be serviced from a front side of the bulkhead. The service opening also allows components of the evaporator unit to be removed out from the service opening or reinstalled through the service opening.

In some embodiments, a method of servicing a TRU includes removing an access door from a bulkhead service opening to access an evaporator unit of the TRU.

With respect to the removal shelf, in some embodiments, a bulkhead includes a bulkhead body having a peripheral edge, and a center portion surrounded by the peripheral edge, where the center portion is offset from a plane defined by the peripheral edge; a service opening defined in the most offset portion of the center portion; and a removal shelf located adjacent a lower edge of the service opening. The removal shelf allows an evaporator blower and motor assembly to rest thereon during removal or reinstallation of the evaporator blower assembly.

Other aspects of the invention will become apparent by consideration of the detailed description and accompanying drawings.

BRIEF DESCRIPTION OF THE DRAWINGS

Referring now to the drawings in which like reference numbers represent corresponding parts throughout.

DETAILED DESCRIPTION

Figure 1:
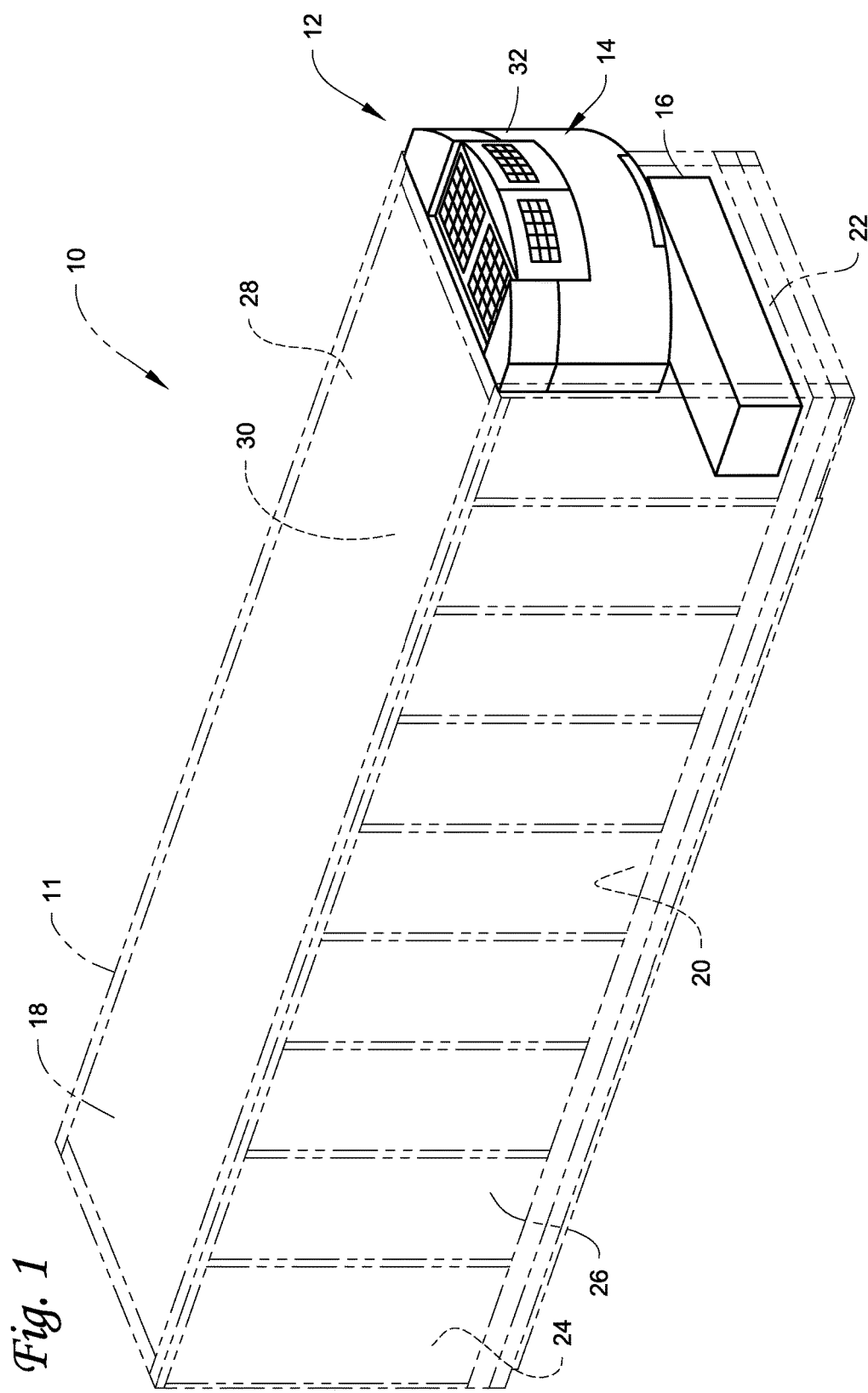
FIG. 1 illustrates a side perspective view of a conditioned transport unit with a TRS, according to one embodiment.

The embodiments described herein are directed to a TRS. More particularly, the embodiments relate to a bulkhead in a TRS for use in a TRU.

The terms "above," "on," "under," "top," "bottom," "up," "down," "upper," "lower," "horizontal," "vertical," "front," "rear," "left," "right" and the like used herein are in reference to the relative positions of the TRU components, the bulkhead and its constituent parts, as oriented in the specific figures being described. These terms are not meant to be limiting in any way.

In particular, the embodiments described herein are directed to a bulkhead for use in a TRU that is configured to create optimal air flow on both a front side (e.g. the side where the condenser unit is located) and a rear side (e.g. the side where the evaporator unit is located) of the bulkhead, provide structural support for various components of the TRU, such as an air filter, a fuel filter, an evaporator blower, condenser blowers, an evaporator coil, condenser coils, etc., and provide a thermal barrier between the front side (e.g. the side where the condenser unit is located) and the rear side (e.g. the side where the evaporator unit is located). Also, the bulkhead is configured to include an access door and a service opening that allows a user to access TRU components (e.g. the evaporator unit) located on the rear side of the bulkhead via the front side of the bulkhead. Further, the rear side of the bulkhead is configured to provide a removal support shelf that can be used as a resting surface or a sliding surface for removing components (e.g., components of the evaporator unit) located on the rear side of the bulkhead out of the TRU from the front side of the TRU via the service opening by removing the access door.

References are made to the accompanying drawings that form a part hereof, and in which is shown by way of illustration of the embodiments in which the methods and systems described herein may be practiced. The term "reefer" generally refers to, for example, a conditioned trailer, container, railcars or other type of transport unit, etc. The term "transport refrigeration system" or "TRS" refers to a refrigeration system for controlling the refrigeration of an in conditioned space of the reefer. The term "bulkhead" refers to a partition in the TRS system that has a specialized construction to permit a conditioned cargo space to be separated from the portion of the TRS that is located outside of a reefer, where the bulkhead structure also provides a flow path for air through the conditioned space within the reefer. The term "conditioned air" refers to air that has been treated so as to maintain a desired condition, for example, desired temperature or desired moisture control. The term "conditioned space" or "conditioned environment" refers to a space, a zone or an environment that receives the treated air.

It will be appreciated that the embodiments described herein may be used in any suitable transport unit such as a ship board container, an air cargo cabin, an over the road truck cabin, etc.

FIG. 1 illustrates a side view of a reefer 10 that includes a transport unit 11 and a transport refrigeration system (TRS) 12 that includes a transport refrigeration unit (TRU) 14 connected to a generator set (genset) 16. The transport unit 11 includes a roof 18, a floor 20, a front wall 22, a rear wall 24, and opposing sidewalls 26, 28. The TRU 14 is positioned on the front wall 22 of the transport unit 11. The TRS 12 is configured to transfer heat between a conditioned cargo space 30 and the outside environment.

Figure 2:
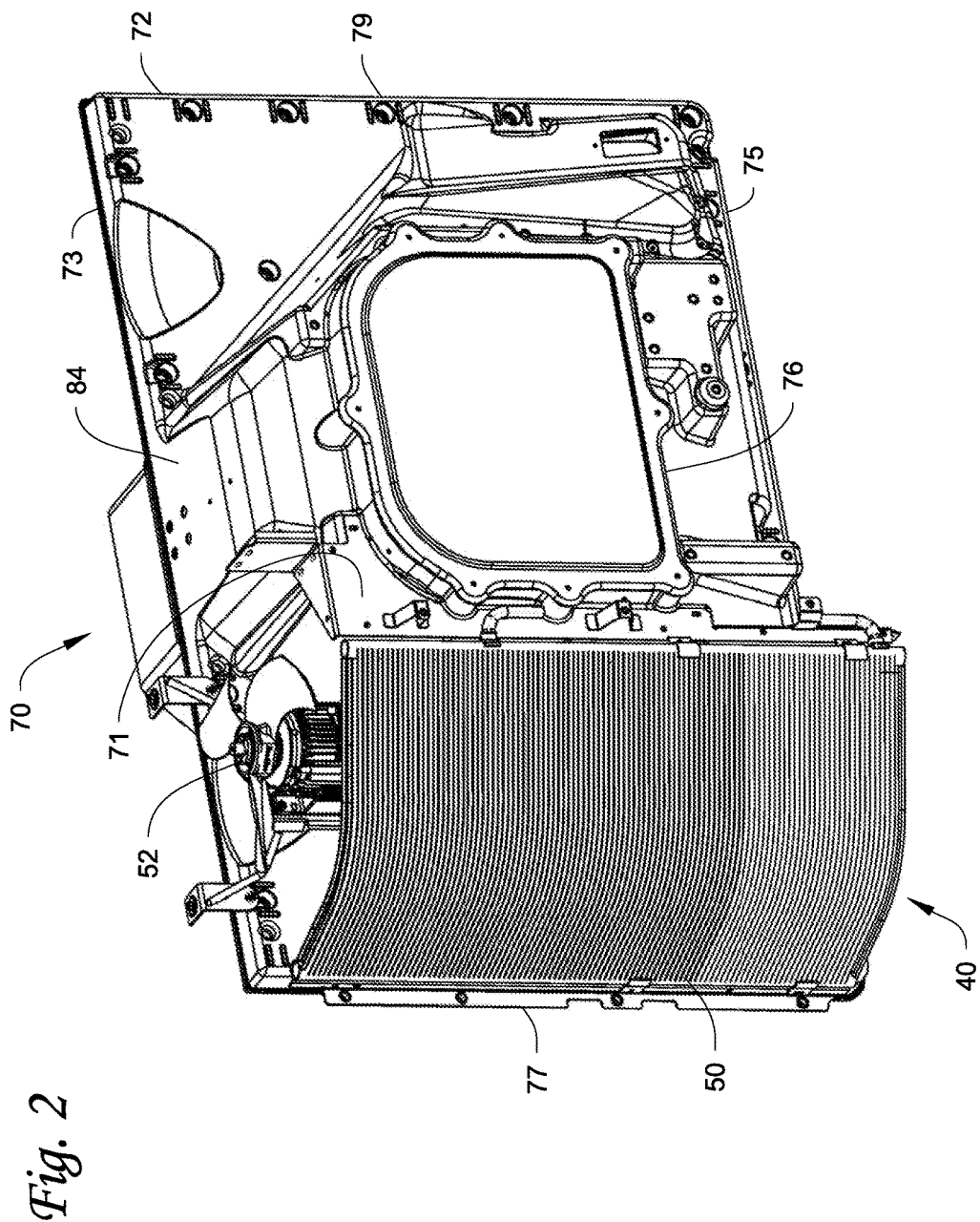
FIG. 2 illustrates a perspective view of an outer side of a bulkhead with a condenser mounted on an outside surface of the bulkhead, according to one embodiment.
Figure 6:
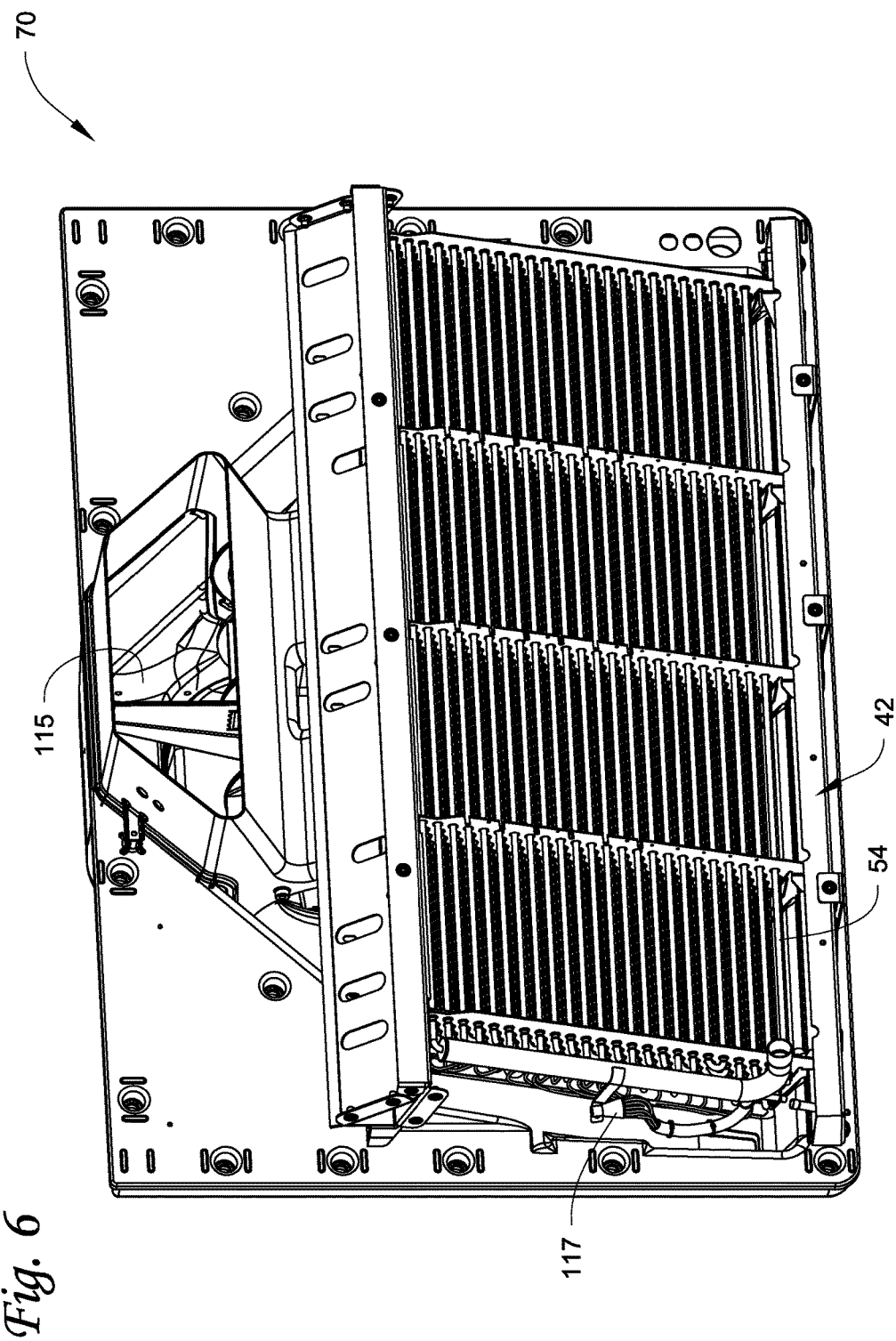
FIG. 6 illustrates a perspective view of an inner side of the bulkhead of FIG. 2, with an evaporator being mounted on an inner surface of the bulkhead.
Figure 7:
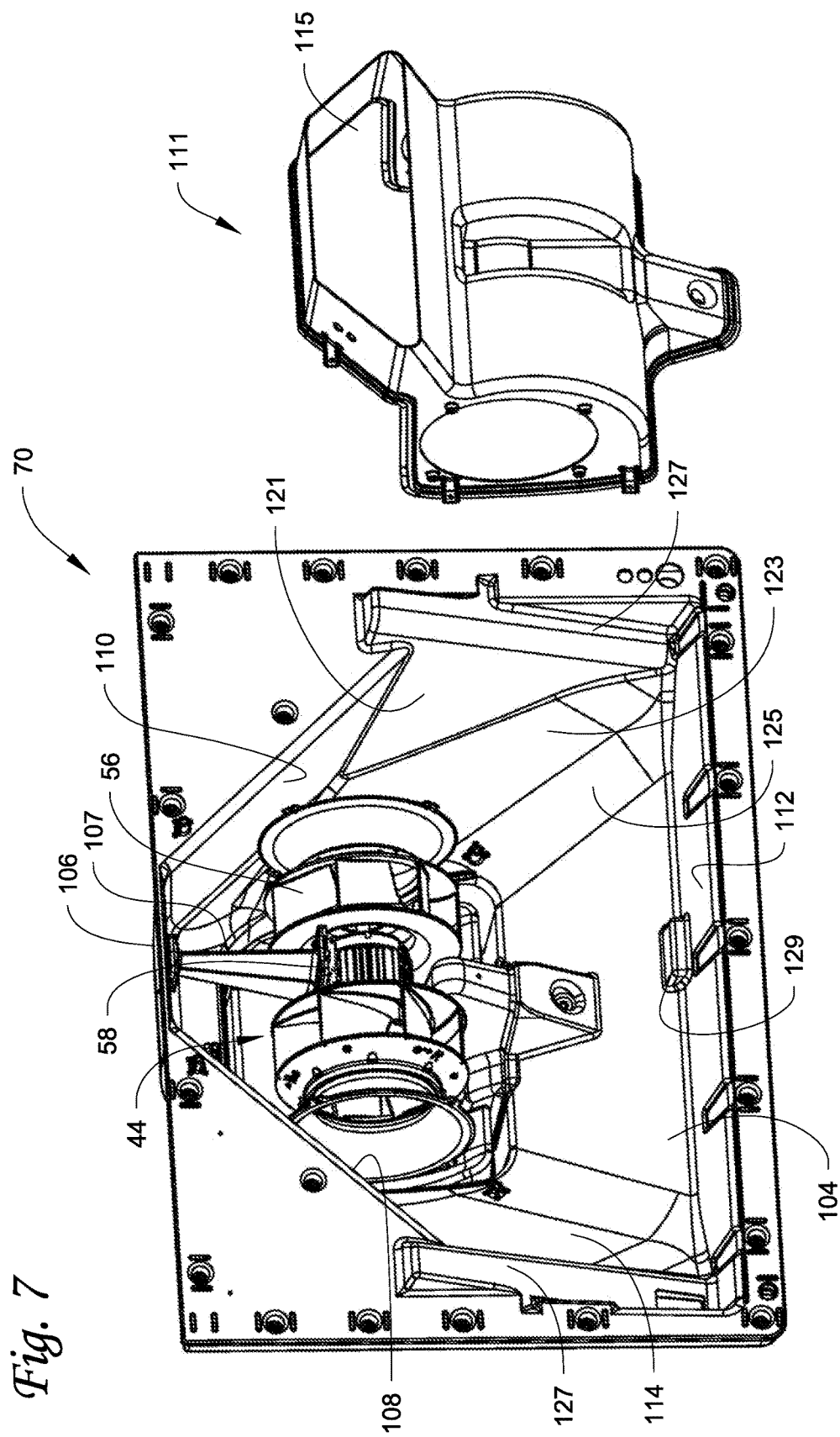
FIG. 7 illustrates a perspective view of the inner side of the bulkhead of FIG. 2, with the cover for the evaporator blower being removed, exposing the blower.

As shown in FIG. 1, the TRU 14 is enclosed in a housing 32. The TRU 14 is in communication with the space 30 and controls the temperature in the space 30. The TRU 14 includes a closed refrigerant circuit (not shown) powered by the genset 16, which regulates various operating conditions (e.g., temperature, humidity, etc.) of the space 30 based on instructions received from a TRS controller. In some embodiments, the refrigeration circuit includes, for example, a compressor unit (not shown), a condenser unit 40 having a condenser coil 50 and a blower 52 as shown in FIG. 2, an evaporator unit 42 having a evaporator coil 54, a blower assembly 44 including a blower 56 and a motor 58 for driving the blower 56 (as shown in FIGS. 6 and 7), and a refrigerant receiver (not shown).

Figure 3:
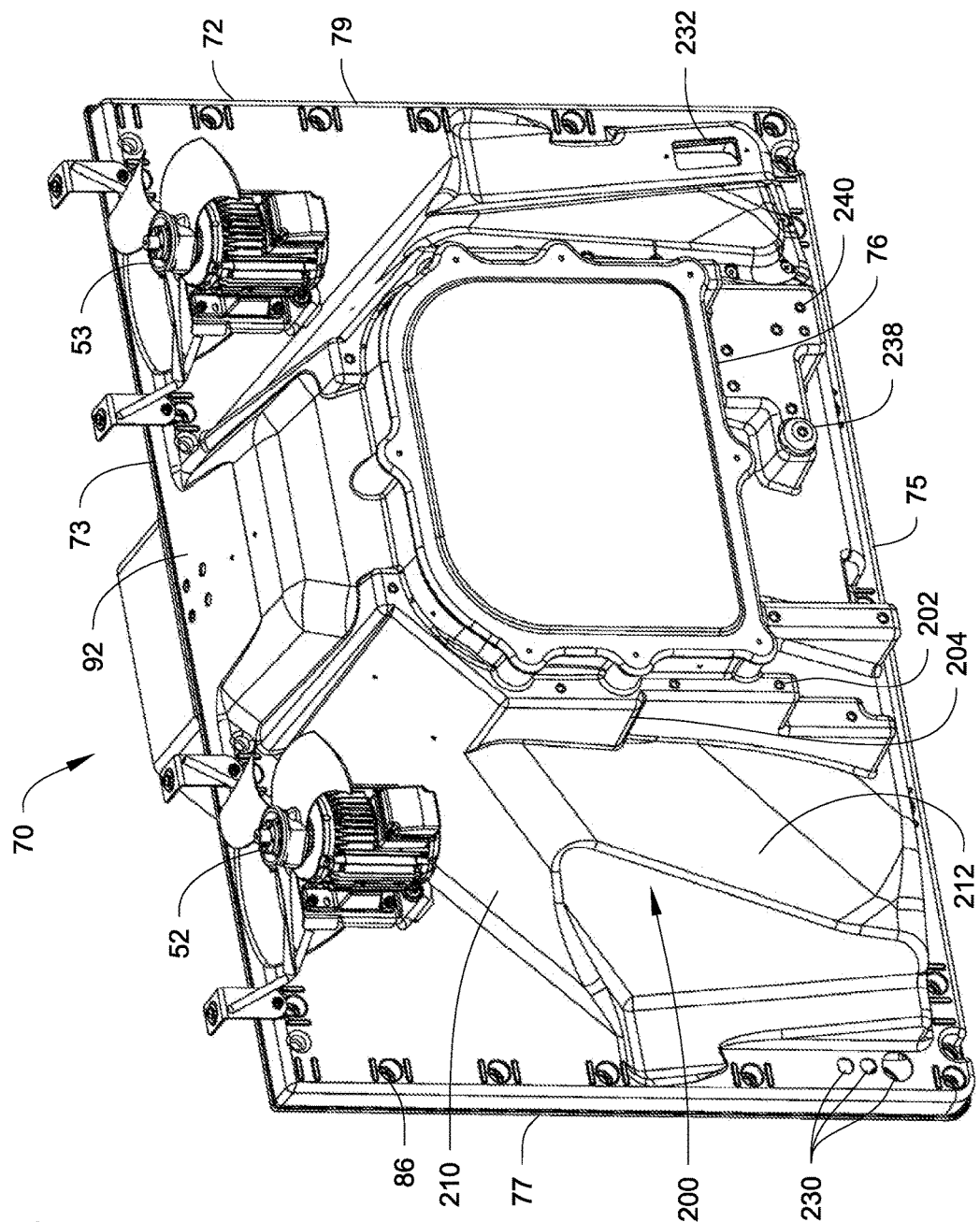
FIG. 3 illustrates another perspective view of the outer side of the bulkhead of FIG. 2, without the condenser mounted thereto.
Figure 4:
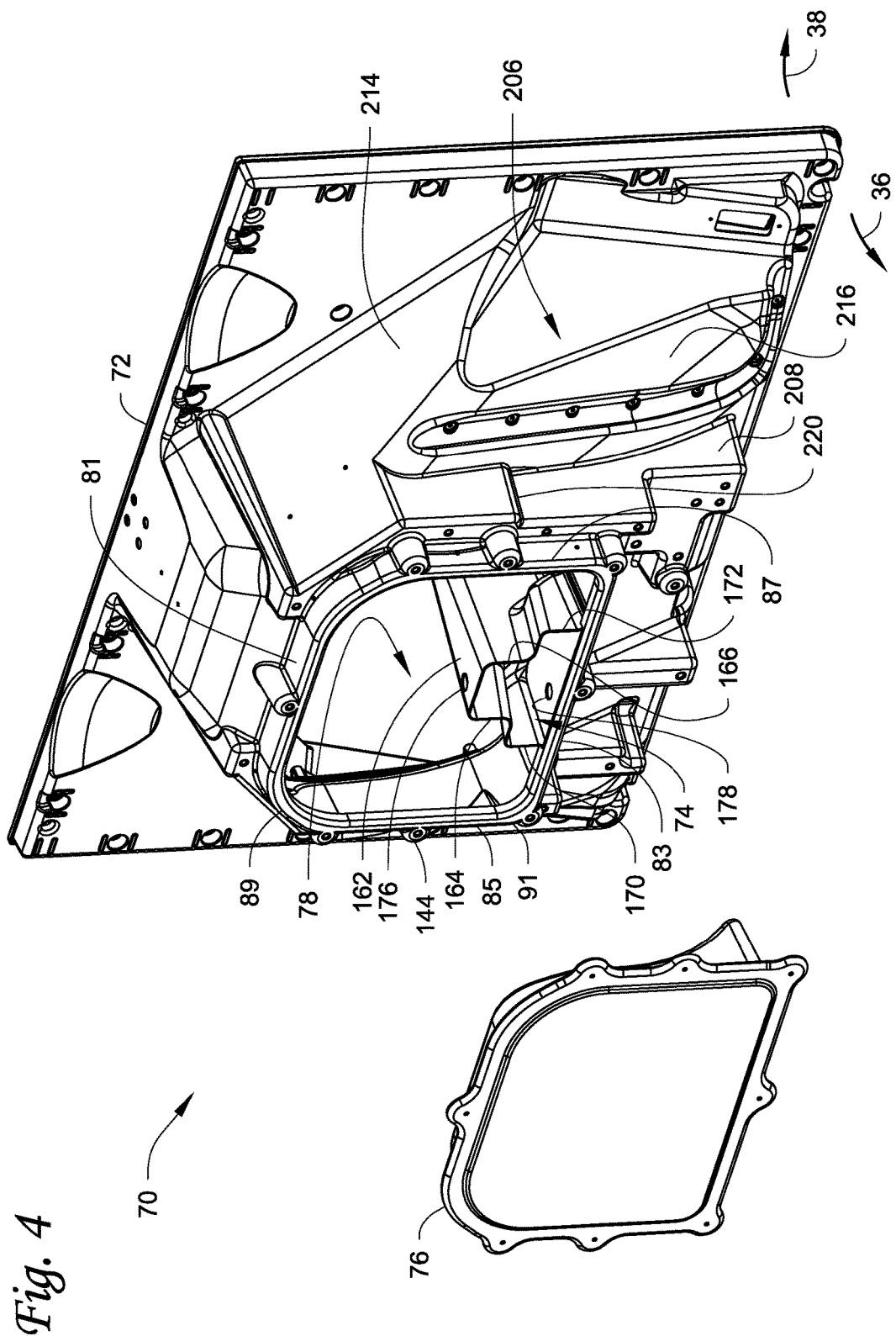
FIG. 4 illustrates a perspective view of an outer side of the bulkhead of FIG. 2 with an access door being disassembled.

The TRU also includes a bulkhead 70, as shown in FIGS. 2-9, dividing the TRU into a front side 36 and a rear side 38, as shown in FIG. 4. The bulkhead 70 separates the condenser unit 40 from the conditioned space 30. The bulkhead 70 is located at the front of the transport unit 11 and is mounted to the front wall behind the condenser unit 40.

Figure 8:
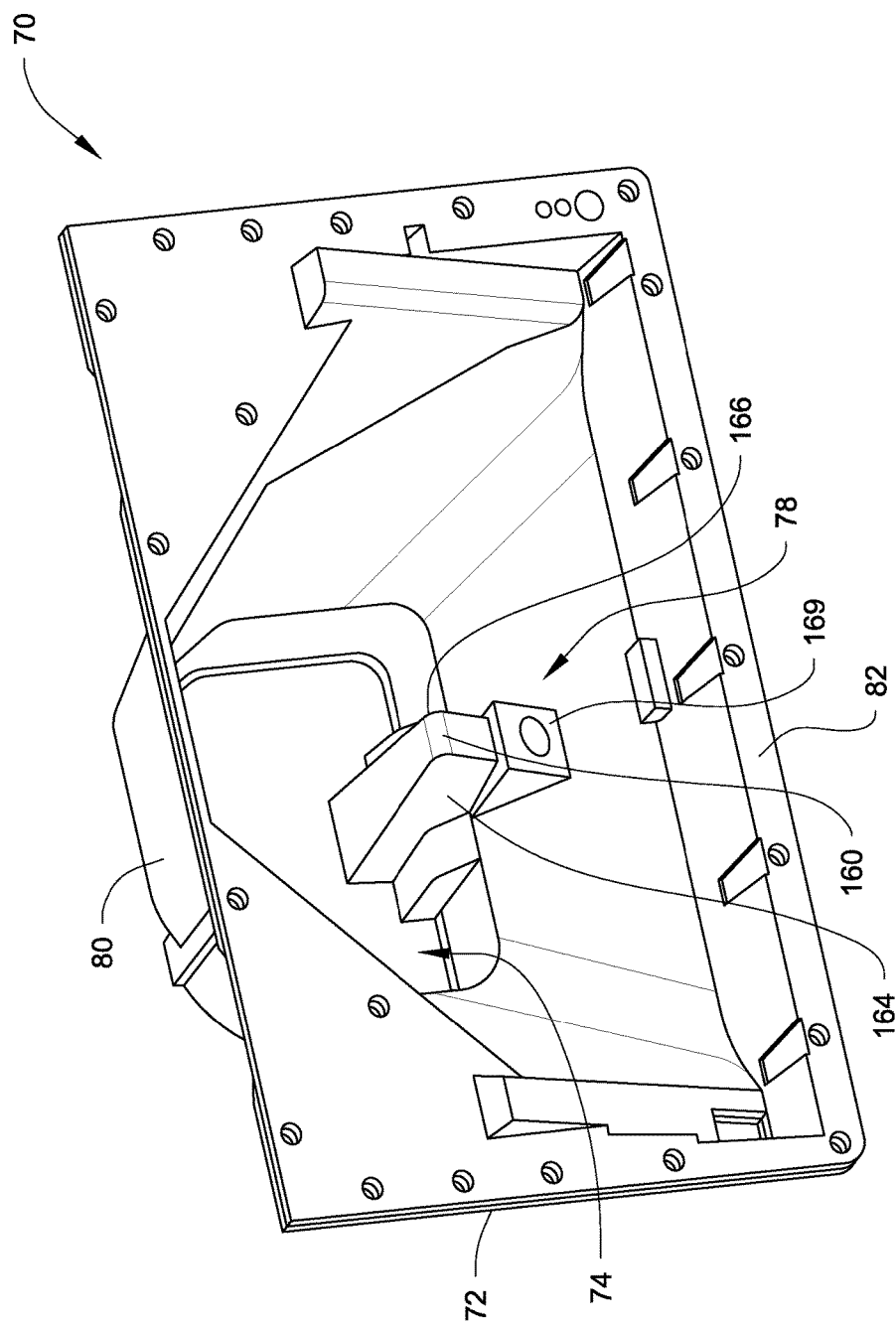
FIG. 8 illustrates a perspective view of a bulkhead, according to one embodiment.

With reference to FIGS. 2-9, in some embodiments, the bulkhead 70 includes a generally rectangular body 72, a generally rectangular service opening 74 defined in the body 72, a generally rectangular access door 76 that closes the service opening 74 and a removal shelf 78, as shown in FIGS. 4 and 8, that allows the evaporator blower assembly 44 to rest thereon during removal or reinstallation of the evaporator blower assembly 44.

The surfaces and contours of the bulkhead body 72 are adapted to create optimal air flows on the front side 36 and the rear side 38 of the bulkhead 70 to facilitate optimal air flow return to the condenser unit 40 and the evaporator unit 42. The bulkhead body 72 includes top peripheral portion 73, a bottom peripheral portion 75, and side peripheral portions 77, 79 extending substantially along the side edges of the bulkhead body 72. A center portion 71 surrounded by the peripheral portions 73, 75, 77, 79 angles outwardly as it extends from the peripheral portions 73, 75, 77, 79. As a result, the center portion 71 is offset from the peripheral portions 73, 75, 77, 79. At the most offset portion of the center portion 71, the service opening 74 is defined. In one embodiment, the service opening 74 is positioned in a plane parallel to the plane defined by the peripheral portions 73, 75, 77, 79 of the bulkhead body 72. The access door 76 is adapted to close the service opening 74. In some embodiments, the surfaces and contours of the bulkhead body 72 are configured to provide air flows on both the front side 36 and the rear side 38 of the bulkhead 70 at a rate of about 3300 cfm.

The offset of the center portion 71 of the bulkhead body 72 allows a receiving space 100 to be formed between the peripheral portions 73, 75, 77, 79 and the access door 76 to receive the evaporator unit 42. The receiving space 100 is adapted to be fitted around the evaporator unit 42. By angling the bulkhead body 72 in this manner, the conditioned space return air is more efficiently returned to the evaporator unit 42. The manner how the bulkhead 70 helps create optimal air flows on the front side 36 and the rear side 38 of the bulkhead 70 to facilitate optimal air flow return to the condenser unit 40 and the evaporator unit 42 will be discussed in further detail below.

As shown in FIG. 3, apertures 230 are formed at the peripheral portion 77 to allow refrigeration lines (not shown) such as copper refrigeration tubes for high and low pressure refrigerant to pass through. A rectangular shaped opening 232 is formed at the peripheral portion 79 to allow electrical cables to pass through. A fuel filter mounting insert 238 is disposed below the service opening 74. In addition, brass inserts are molded in the bulkhead body 72 for attachment of components, e.g., brass inserts 240 are disposed adjacent to the fuel filter mounting insert 238 for attachment of components.

Figure 5:
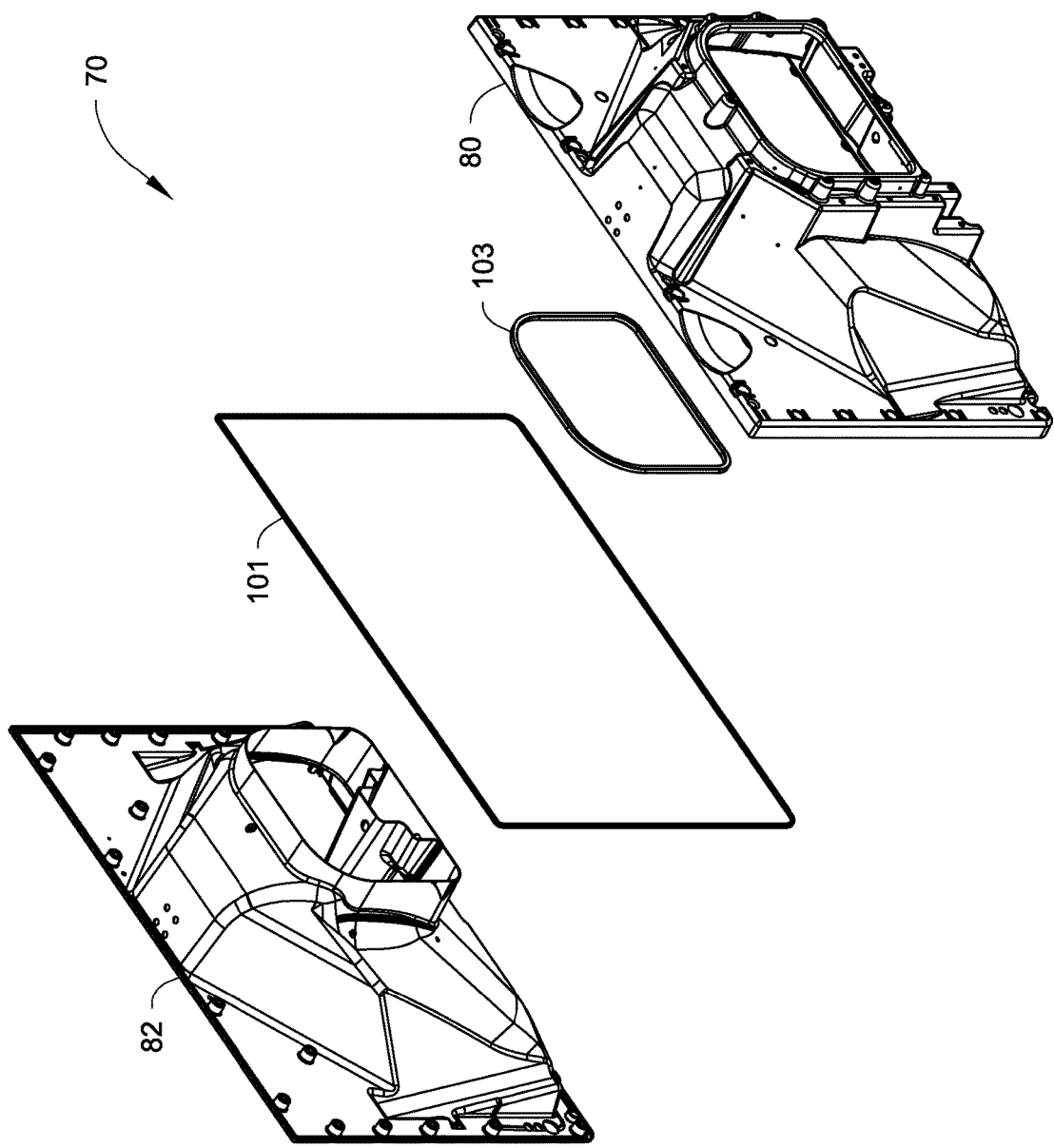
FIG. 5 illustrates an exploded perspective view of the outer side of the bulkhead of FIG. 2, with the access door being removed.
Figure 9:
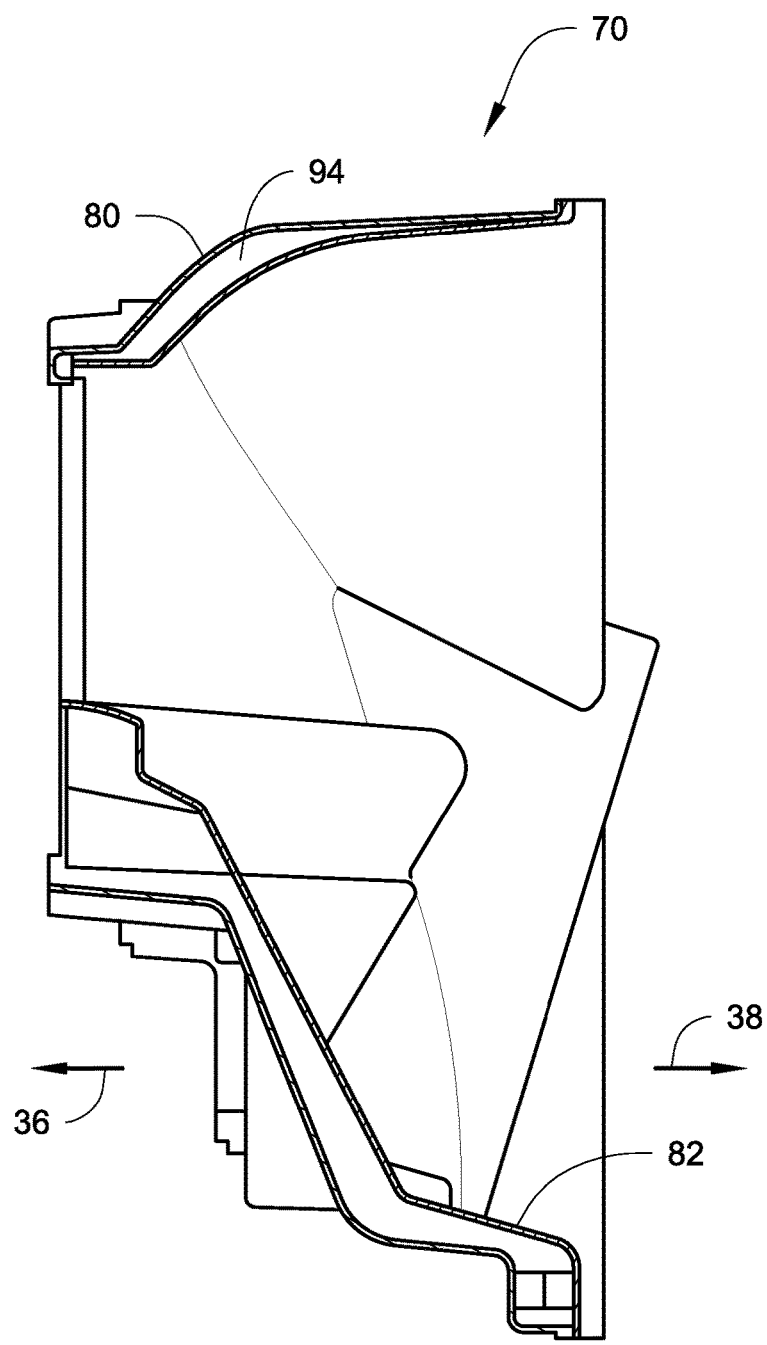
FIG. 9 illustrates a cross section view of a portion of the bulkhead of FIG. 8.

With reference to FIGS. 5 and 8-9, the bulkhead body 72 includes an inner panel 82, an outer panel 80 generally tracking the contour of the inner panel 82 and an insulation layer 94 positioned between the inner panel 82 and the outer panel 80. Specifically, as shown in FIGS. 6-9, the receiving space 100 surrounded by the inner panel 82 includes an upper space 102 generally in a trapezoidal shape, and a lower space 104 generally in a rectangular shape. The upper space 102 has a top wall 106, and two slanting side walls 108, 110 opposing to each other. The width of the top wall is smaller than a distance between the lower ends of the side walls 108, 110. The side walls 108, 110 are angled inwardly when the side walls 108, 110 extend frontwardly toward the service opening 74. Free edges of the top wall 106 and side walls 108 and 110 form top peripheral edge 81 and side peripheral edges 85, 87 of the service opening 74. A bracket 107 is secured to the top wall 106 to attach the evaporator blower assembly 44 to the inner panel 82. As shown in FIG. 6, the upper space 102 is adapted to receive the evaporator blower 56 and its motor 58.

The lower space 104 includes a bottom wall 112, two side walls 114, 116 and a front wall 118. The bottom wall 112 is generally parallel to the top wall 106, with the width of the bottom wall 112 being greater than that of the top wall 106. The division between the upper space 102 and the lower space 104 is generally leveled with a bottom edge 83 of the service opening 74.

As shown in FIGS. 7 and 8, each side wall 114, 116 includes an upper panel 121 and a lower panel 123. The upper panels 121 face slightly downward when they extend frontwardly. The lower panels 123 extend from the lower edges of the upper panels downwardly so that the lower panels 123 are substantially perpendicular relative to the bottom wall 112. Free edges of the lower panels 123 approach other when the lower panels extend frontwardly toward the service opening 74. A step portion 125 is formed between the front edges of the lower panels 123 and the side edges of the front wall 104. The inner panel 82 also includes two elongate ribs 127 along the rear edges of the upper panels 121 and a protrusion 129 protruding upwardly from the bottom panel 112. The rib 127 and the protrusion 129 each includes installation apertures (now shown) for installation of the evaporator coil 56. The side walls 121, 123 and the step portion 127 are oriented to create an optimal air flow on the rear side 38 of the bulkhead 70 to facilitate optimal air flow return to the evaporator coil 52. As shown in FIG. 6, the lower space 104 is adapted to fit around the evaporator coil 52.

With respect to FIGS. 7 and 8, the inner panel 82 also includes a plurality of deflection surfaces to create an optimal air flow on the rear side 38 of the bulkhead 70 to facilitate optimal air flow return to the evaporator unit 42.

In the embodiment as shown in FIGS. 6 and 7, an evaporator blower cover 111 is used to cover the evaporator blower 56 and the motor 58. The cover 111 includes an air outlet opening 115. The blower 56 blows conditioned air out through the air outlet opening 115 and forces the conditioned air throughout the conditioned space 30 to maintain the air temperature in the transport unit 11 at a desired temperature. The lower space 104 of the receiving space 100 is adapted to fit around the evaporator coil 54.

With reference to FIGS. 2-5, the outer panel 80 generally tracks the contour of the inner panel 82 and defines a top wall 92 extending outwardly from the top peripheral portion 73 of the bulkhead. The top wall 92 is designed to track the top wall 106 of the inner panel 82.

As shown in FIG. 3, the outer panel 80 includes a generally L shaped transition member 200. The transition member 200 includes a top panel 210 and a side panel 212. The side panel 212 is angled from the left side peripheral portion 77 rearwardly toward the service opening 74. A step 202 is formed between a peripheral edge of the service opening 74 and the right edge of the side panel 212. The step 202 is designed to fit around the condenser coil 52 with a top section 204 protruding toward the side panel 212. The top panel 210 is angled slightly upward when it extends rightwardly and frontwardly. The top panel 210 is then angled slightly downwardly when it passes the step portion 202 and extends rightwardly and frontwardly toward the service opening 74. The condenser blower 52 is partially supported by the top panel 210.

Likewise, in the embodiment as shown in FIG. 4, the outer panel 80 may also include another generally L shaped transition member 206. The transition member 206 includes a top panel 214 and a side panel 216. The side panel 216 is angled from the right side peripheral portion 79 rearwardly toward the service opening 74. A step 208 is formed between a peripheral edge of the service opening 74 and the left edge of the side panel 216. In an embodiment when the bulkhead 70 is designed to support two condenser coils, the step 208 is designed to fit around a right condenser coil (not shown) with a top section 220 protruding toward the side panel 212. The top panel 220 is angled slightly upward when it extends rightwardly and frontwardly. The top panel 214 is then angled slightly downwardly when it passes the step portion 220 and extends rightwardly and frontwardly toward the service opening 74. As shown in FIG. 4, another condenser blower 52 is partially supported by the top panel 214.

The transition members 200, 206 are oriented to create an optimal air flow on the front side 36 of the bulkhead 70 to facilitate optimal air flow return to the condenser coil 50.

The outer and inner panels 80, 82 are made from a sheet molding compound (SMC) material that has an exceptional rigidity and strength; as a result, the bulkhead 70 can provide effectively structural support for components of the condenser unit 40 and the evaporator unit 42. The SMC material comprises long strands of chopped reinforcing glass fibers in a polyester resin base. The polyester resin base is compounded with suitable catalysts, such that it is stable in both high and low temperatures. However, the polyester resin base becomes moldable when the catalysts are activated. The SMC material is thus particularly suitable for molding under catalysts in a closed mold. Articles formed in this way are found to have exceptionally high strength, in some cases equaling to that of steel. This property allows the bulkhead 70 to provide structural support for components of the condenser unit 40 and the evaporator unit 42, for example, it can support components with a total weight of over about 100 pounds. In some embodiments, the bulkhead 70 can provide structural support for the entire condenser unit 40 and the entire evaporator unit 42.

The insulation layer 94 of the bulkhead body 72 helps form a thermal barrier between the evaporator unit 42 and the condenser unit 40, thereby preventing energy loss in the TRU effectively. With reference to FIG. 9, the insulation layer 94 is positioned between the outer panel 80 and the inner panel 82. The insulation layer 94 is formed of a two-part polyurethane foam, which helps create an effective thermal barrier or insulating barrier between the evaporator unit 42 and the condenser unit 40, thereby preventing energy loss in the TRU. In one embodiment, the two-part polyurethane includes a rigid expanding foam for refrigeration applications. In addition, the two-part polyurethane is adhesive in nature. As a result, the insulation layer 94 made of the two-part polyurethane adheres to inner surfaces of both panels 80, 82. This allows formation of an integral bulkhead body 72, without any additional fastening mechanism. In one embodiment, the two-part polyurethane is disposed between the outer and inner panels 80, 82 throughout the bulkhead body 72. The thickness of the insulation layer 94 is preferably about 2 inches throughout the bulkhead body 72.

With reference to FIG. 5, a first seal 101 is formed between the peripheral of the outer panel 80 and that of the inner panel 82, and a second seal 103 is formed between the peripheral of the service opening 76 on the outer panel 80 and that on the inner panel 82.

In some embodiments, to make the bulkhead body 72, the composite of suitable SMC material is first placed in a bottom portion of a suitable mold. A top mold is then lowered onto the lower mold and the article is molded under pressure to form the final shape. The article is then removed from the mold and cooled. Any remaining flash is then trimmed. The inner and outer panels of the bulkhead 70 are then assembled and placed in a foaming fixture. A two-part polyurethane foam is then injected into a space between the outer and inner panels 80, 82 where it cures in place between the outer and inner panels 80, 82, adhering to inner surfaces of both panels 80, 82. As a result, a single homogeneous integral article is formed.

The SMC bulkhead 70 helps effectively reduce the assembly time and cost. It allows components to be directly mounted to the bulkhead body 72. This allows the number of parts and cost for making the bulkhead to be significantly reduced. In addition, the SMC material is a corrosion free material and thus allows an extended life of the bulkhead.

Referring back to FIGS. 1 and 3, installation apertures 86 are provided along the free edges of the bulkhead body 72, for installation of the bulkhead 70 against the front wall 22 of the transport unit 11. Also, the peripheral edge of the bulkhead body 72 provides a surface area necessary to form the seal between the bulkhead 70 and front wall 22 of the transport unit 11, when the bulkhead is in use. The bulkhead 70 is attached to the front wall 22 by way of a plurality of fasteners (not shown) passing through the installation apertures 86. Screws, bolts, rivets or studs are suitable fasteners for attaching the bulkhead 5 securely to the front wall 22. In addition, a gasket (not shown) can be used between the front wall 22 and the bulkhead 70.

In operation, air from the environment is pulled and directed through the condenser coil 50. At substantially the same time, the compressor compresses a gaseous refrigerant and directs the compressed refrigerant through the condenser coil 50. The condenser blower 52 direct the airflow over the condenser coil 50 to cool and condense the compressed refrigerant into a liquid refrigerant that is directed to and temporarily stored in the corresponding refrigerant receiver. After passing over the condenser coil 50, the air is forced through the condenser blower 52 and discharged back into the environment.

Figure 11:
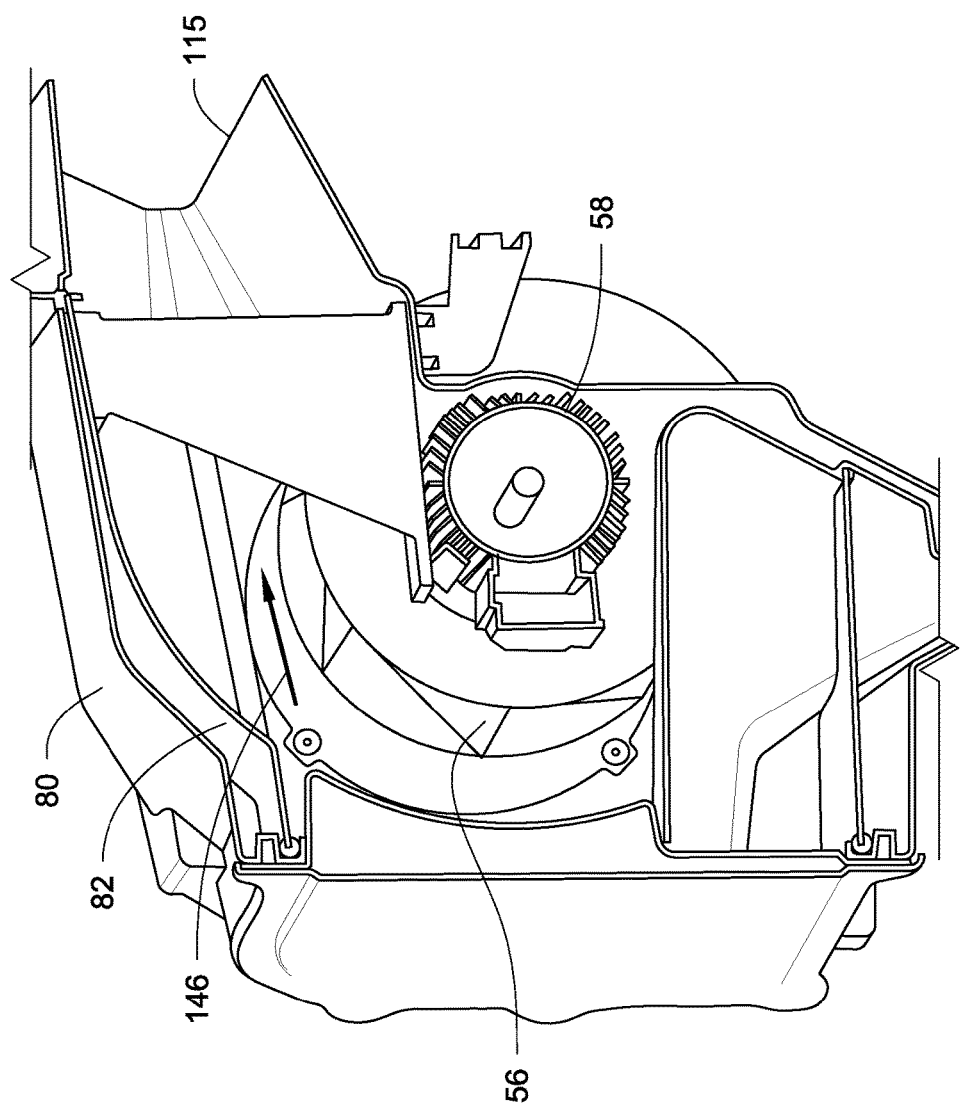
FIG. 11 illustrates a cross sectional perspective view of the bulkhead of FIG. 8, with the evaporator blower assembly mounted thereto.

Meanwhile, the liquid refrigerant flows out of the receiver and is directed to the evaporator unit 42. The liquid refrigerant is forced through an expansion valve 117 that converts the refrigerant into a two-phase fluid, as show in FIG. 6. The expansion valves 117 are generally located with the evaporator unit 42 on the inner side of the bulkhead 70, although the expansion valves 117 may alternatively be positioned in other locations, as desired. As shown in FIGS. 6-7 and 11, the evaporator blower 56 draws warm air from the conditioned space 30 into the evaporator coil 54. The warm air flow 119 enters through the bulkhead 70 where the two-phase refrigerant absorbs heat from air. The refrigerant generally leaves the evaporator unit 42 in a heated condition and is routed back to the compressors unit 40 for recycling. The cooled air exiting the air outlet opening is directed back into the conditioned space 30, where it will remove heat from the cargo and maintain the cargo at the desired temperature.

Now turning to the service opening 74, as shown in FIGS. 4 and 8, the service opening 74 allows access to the evaporator unit 42 from the front side 36 of the bulkhead 70. The access door also allows components of the evaporator unit 42, e.g., the evaporator blower 56 or its motor 58, to be removed out from the service opening 74 or reinstalled through the service opening 74. In one embodiment, the entire evaporator blower assembly 44 can be removed out of the service opening 74. In a conventional TRU, access to an evaporator unit is only available from the rear side 38 of the bulkhead. Thus, to access the evaporation unit, a person must enter the transport unit, or the bulkhead must be disassembled from its fixed position on the front wall of the transport unit. Accessing and entering the TRU, and removal of the bulkhead can be extremely complex and time consuming. Additionally, the regular removal and reattachment of the bulkhead to the front wall of the transport unit can reduce the integrity of seals between the bulkhead and the front wall and can weaken the bulkhead or result in cracks developing in the bulkhead.

As shown in FIGS. 4, 8 and 9, the service opening 78 includes a top edge 81, a bottom edge 83 and opposing side edges 85, 87. In this embodiment, the upper corners 89 and lower corners 91 of the service opening 76 are curved corners. The upper corners 89 have a greater curvature than that of the lower corners 91. Installation apertures 144 are formed on the peripheral edges 81, 83, 85, 87 of the service opening 74.

With reference to FIGS. 2-3, 6 and 10-12, the access door 76 cooperates with the service opening 74 to facilitate service of the evaporator unit 42, for example, repair, installation or removal of components of the evaporator unit 42. The access door 76 includes an outer panel 130, an inner panel 132 and an insulation layer 133 positioned between the outer and inner panels 130, 132. The access door 130 includes a peripheral edge 134 and a center portion 136 surrounded by the peripheral edge 134. The center portion 136 has a greater thickness than that of the peripheral edge 134, allowing the insulation layer 133 to be formed between the outer panel 130 and the inner panel 132 throughout the center portion 136.

Figure 10:
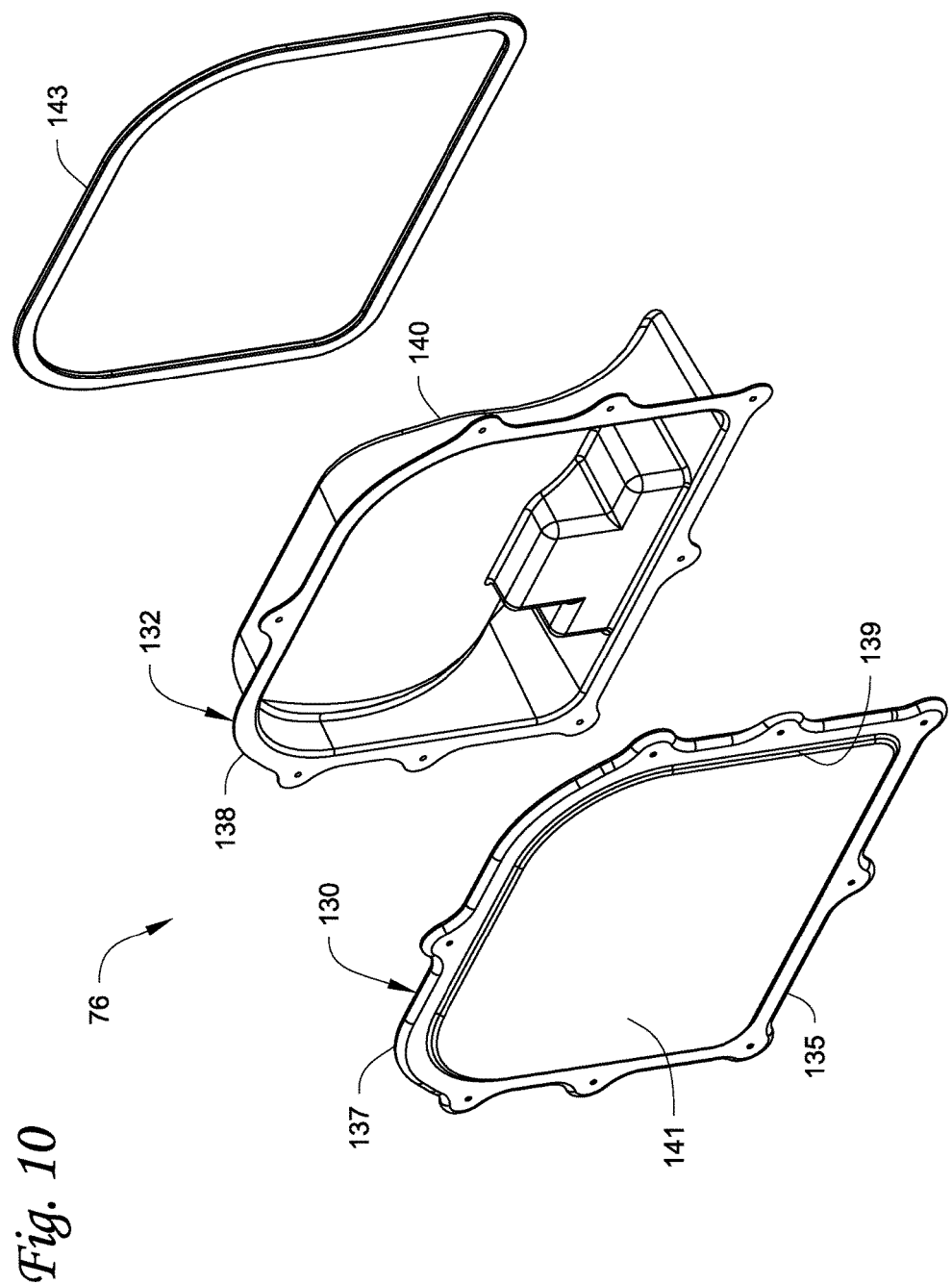
FIG. 10 illustrates an exploded perspective view of a portion of the bulkhead of FIG. 2.

With reference to FIG. 10, the outer panel 130 is a generally rectangular plate, including a peripheral portion 135 and a center portion 141 surrounded by the peripheral portion 135, a peripheral rim 137 extending from the peripheral portion 135 toward the rear side 38 to cooperate with the inner panel 132, and a stepped portion 139 formed between the peripheral portion 135 and the center portion 141, protruding frontwardly toward the front side 36, thereby allowing a greater thickness of the insulation layer 133 to be obtained.

Figure 13:
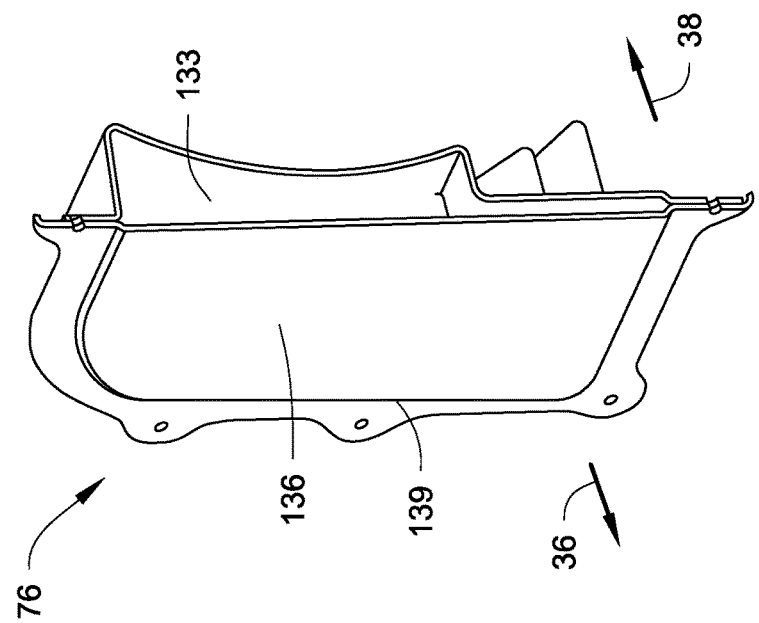
FIG. 13 illustrates a cross sectional perspective view of the access door of FIG. 12.
Figure 12:
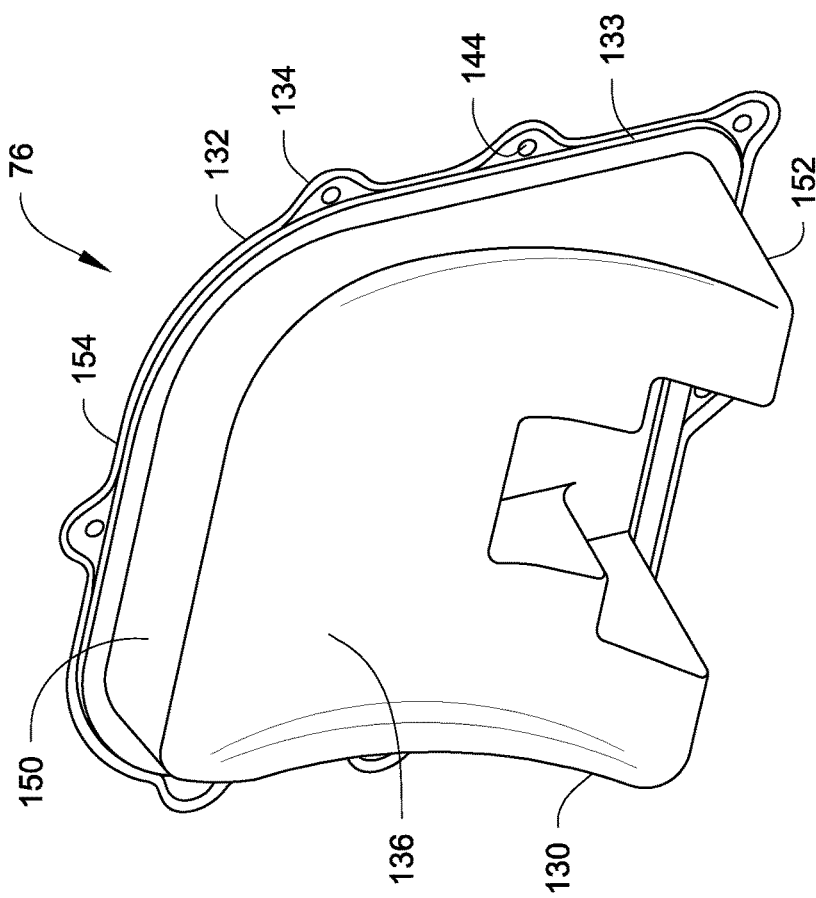
FIG. 12 illustrates a perspective view of an access door of a bulkhead, according to one embodiment.

Likewise, the inner panel 132 is also in a generally rectangular shape. The inner panel 132 includes a peripheral portion 138 and a center portion 140 surrounded by the peripheral edge 138. The peripheral portion 138 is sized to be fastened with the peripheral portion 135 of the outer panel 130 by a suitable fastening mechanism, for example, by welding. The rim 137 extends over the periphery of the peripheral portion 138. The center portion 140 of the inner panel 132 protrudes rearwardly when the access door 76 is installed to close the service opening 74. As shown in FIGS. 11-13, a guide ramp 150 is formed at a peripheral portion of the center portion 140 to guide the center portion 140 to advance into the service opening 74. The center portion 140 of the inner panel 132 is shaped to track the curvature of the inner panel 82 of bulkhead body 72 to allow proper and smoother airflow 146 to be formed. As a result, the center portion 140 of the inner panel 132 of the access door 76 protrudes outwardly when it extends toward to its center. The guide ramp 150 extends further inwardly at its lower portion 152 of the center portion 140 than at its upper portion 154 such that a larger room is formed at the lower portion 152 than that formed at the upper portion 154. A cavity 156 is formed at the lower portion 154 of the center portion 140 to receive a front end of the removal shelf 78. The peripheral edge 134 of the access door 76 includes a plurality of installation apertures 142 that can cooperate with the installation apertures 144 on the peripheral edges 81, 83, 85, 87 of the service opening 74 to allow the access door 76 to be fastened to the service opening 74. In one embodiment, the access door 76 is mounted to the outer panel 80 by a plurality of fasteners, e.g., by screws or rivets. In one embodiment, the access door 76 is mounted to the bulkhead body 72 by M6 screws. A gasket 143 can be used to attach between the inner panel 132 of the access door 76 and the outer panel 80 of the bulkhead body 72 to provide an air tight seal between the access door 76 and the bulkhead body 72.

Likewise, in a preferred form of construction, the outer and inner panels 130, 132 of the access door 76 can be made of SMC material, which may be cut into a designed shape. The two-part polyurethane foam is injected into a space between the outer and inner panels 80, 82 where it cures in place between the outer and inner panels 130, 132 to form the insulation layer 133, adhering to inner surfaces of both panels 130, 132. As a result, a single homogeneous integral article is formed. The thickness of the insulation layer 133 is preferably about 2 inches throughout the center portion 136 of the access door 76.

In operation, the access door 76 provide a quick access functionality which permits the access door 76 to be easily removed from and reinstalled on the bulkhead body 72. That, in turn, permits a user to quickly and efficiently clean or repair the components of the evaporator unit 42. When it is necessary to service or repair the components of the evaporator unit 42, fasteners, e.g., rivets only need to be removed from the peripheral edge of the access door 76, and then once the fasteners are removed the access door 76 can simply be moved away from the service opening 74, making it easy for a service technician to access the components of the evaporator unit 42 that require servicing such as the evaporator blower 56.

Now turning to the removal shelf 78, as shown in FIGS. 4, 9 and 10, the removal shelf 78 is formed adjacent the bottom edge 83 of the service opening 74 to provides a support for the evaporator blower assembly 44, allowing the assembly 44 to rest on the shelf during removal or reinstallation of the assembly.

The removal shelf 78 is in a generally elongate shape, extending rearwardly from the bottom edge 83 of the service opening 74 toward an internal space of the transport unit 11. The removal shelf 78 is tapered when it extends to its rear end 160. The removal shelf 78 includes a top wall 162, two opposing side walls 164, 166, a bottom wall 168 and a rear wall 169. The two side walls 164, 166 extend sideway toward the two opposing side edges 85, 87 of the service opening 74 and form two side shelves 170, 172 at the front portion of the removal shelf 78. At the rear portion of the removal shelf 78, the side walls and the rear wall 169 of the removal shelf 78 extend downwardly to meet the inner panel 82 of the bulkhead body 72. The bottom wall 168 is generally parallel with respect to the top wall 162. At the front portion of the removal shelf 78, the bottom wall 168 is formed by the inner panel 82 adjacent the bottom edge 83 of the service opening 74. The bottom wall 168 extends all the way back to meet the rear wall 169 of the removal shelf 78, forming a step 174. The step 174 is formed where the bottom wall 168 meets the side walls 164, 166 and the rear wall 169 in the rear portion of the removal shelf 78. An installation aperture 176 is formed in the top wall 162 and a similar aperture 178 is formed at a corresponding location in the bottom wall 168 in the front portion of the removal shelf 78. Another installation aperture 180 is formed in the rear wall 169 between the step 174 and a lower end of the rear wall 169 at which the rear wall 169 meets the inner panel 82 of the bulkhead body 72. The installation aperture 180 is used for retain the evaporator coil 54 to the bulkhead body 72.

Aspects:

It is noted that aspect 1 below can be combined with any of aspects 2-7, aspect 8, aspect 9, aspects 10-15, aspects 16-17 and aspect 18. Also, any of aspects 2-7 below can be combined with any of aspect 8, aspect 9, aspects 10-15, aspects 16-17 and aspect 18. Also, aspect 8 below can be combined with any of aspect 9, aspects 10-15, aspects 16-17 and aspect 18. Also, aspect 9 below can be combined with any of aspects 10-15, aspects 16-17 and aspect 18. Also, any of aspects 10-15 below can be combined with any of aspects 16-17 and aspect 18. Also, any of aspects 16-17 below can be combined with aspect 18.

1. A bulkhead for a transport refrigeration unit (TRU), comprising:
   a peripheral edge; and
   a center portion surrounded by the peripheral edge, the center portion being offset from a plane defined by the peripheral edge, defining a receiving space between the peripheral edge and a portion of the center portion that is most offset from the plane defined by the peripheral edge,
   wherein the receiving space is configured to create an optimal air flow on a front side and a rear side of the bulkhead.

2. A bulkhead for a transport refrigeration unit (TRU), comprising:
   an inner panel; and
   an outer panel generally tracking a contour of the inner panel,
   wherein both the outer and inner panels include a sheet molding compound (SMC) material.

3. The bulkhead of aspect 2, wherein the bulkhead is adapted to provide structural support to a condenser unit and an evaporator unit of the TRU.

4. The bulkhead of any of aspects 2-3, wherein the bulkhead is adapted to provide structural support to components that have a weight of over about 100 pounds.

5. The bulkhead of any of aspects 2-4, wherein the SMC material is manufactured by dispersing long strands of chopped glass fibers on a bath of polyester resin.

6. The bulkhead of any of aspects 2-5, wherein the insulation layer is made from two-part polyurethane foam, and the two-part polyurethane foam has a thickness of about 2 inches throughout the bulkhead body.

7. The bulkhead of any of aspects 2-6, wherein the entire bulkhead is made from a SMC material.

8. A bulkhead for a transport refrigeration unit (TRU), comprising:
   an inner panel;
   an outer panel generally tracking a contour of the inner panel; and
   an insulation layer positioned between the inner and outer panels,
   wherein the insulation layer is made from two-part polyurethane foam.

9. A method of manufacturing the bulkhead for a transport refrigeration unit (TRU), comprising:
   forming an inner panel made from a sheet molding compound (SMC) material;
   forming an outer panel generally tracking the contour of the inner panel, the outer panel being made of the SMC material; and
   injecting a two-part polyurethane foam between the outer panel and the inner panel.

10. A bulkhead for a transport refrigeration unit (TRU), comprising:
    a bulkhead body including a peripheral edge, and a center portion surrounded by the peripheral edge, the center portion being offset from a plane defined by the peripheral edge;
    a service opening defined in an offset portion of the center portion; and
    an access door that closes the service opening,
    wherein the access door is oriented parallel to a plane defined by the peripheral edge;
    wherein the service opening is configured to provide access to an evaporator unit of a TRU from a front side of the bulkhead.

11. The bulkhead of aspect 10, wherein the service opening allows access to an evaporator unit of the TRU provided at an inner side of the bulkhead from an outer side of the bulkhead.

12. The bulkhead of any of aspects 10-11, wherein the access door includes:
    an inner panel made from a sheet molding compound (SMC) material;
    an outer panel generally tracking a contour of the inner panel, the outer panel made from the SMC material; and
    a two-part polyurethane foam positioned between the outer panel and the inner panel.

13. The bulkhead of any of aspects 10-12, wherein an inner panel of the access door generally tracks a contour of an inner panel of the bulkhead body.

14 The bulkhead of any of aspects 10-13, wherein the access door is mounted to the bulkhead body by a M6 screw.

15. The bulkhead of any of aspects 10-14, further comprising a gasket attached between an inner panel of the access door and the bulkhead body to provide an air tight seal against the bulkhead body.

16. A method of servicing a transport refrigeration unit (TRU), comprising:
    removing an access door from a bulkhead service opening to access an evaporator unit of the TRU.

17. The method of servicing a TRU of aspect 16, wherein the service opening allows removal and reinstallation of an evaporator blower and a motor of the evaporator unit.

18. A bulkhead for a transport refrigeration unit (TRU), comprising:
    a bulkhead body including a peripheral edge, and a center portion surrounded by the peripheral edge, the center portion being offset from a plane defined by the peripheral edge;
    a service opening defined in a portion of the center portion; and
    a removal shelf located adjacent a lower edge of the service opening, allowing an evaporator blower and motor assembly to rest thereon, allowing the assembly to be slid out or into the service opening.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What is claimed is:

1. A bulkhead for a transport refrigeration unit (TRU), comprising:
   a peripheral edge;
   a center portion surrounded by the peripheral edge, the center portion being offset from a plane defined by the peripheral edge, defining a receiving space between the peripheral edge and the center portion;
   a service opening defined in an offset portion of the center portion; and
   an access door that closes the service opening,
   wherein the service opening is configured to allow access to an evaporator blower or a motor located on a rear side of the bulkhead from a front side of the bulkhead through the service opening without removing the evaporator blower or the motor, and
   wherein the receiving space is configured to create an optimal air flow on a front side and a rear side of the bulkhead,
   wherein a center portion of the access door is shaped to track the curvature of an inner panel of a bulkhead body to facilitate smoothing air flow,
   wherein a lower portion of the rear surface of the access door protrudes rearwardly to form a curved rear surface, and
   wherein the access door includes a guide ramp formed at its outer periphery to guild insertion of the access door into the service opening.

2. A bulkhead for a transport refrigeration unit (TRU), comprising:
   a bulkhead body including a peripheral edge, and a center portion surrounded by the peripheral edge, the center portion being offset from a plane defined by the peripheral edge;
   a service opening defined in an offset portion of the center portion;
   an access door that closes the service opening;
   an inner panel;
   an outer panel tracking a contour of the inner panel; and
   an insulation layer positioned between the inner and outer panels,
   wherein the access door is oriented parallel to the plane defined by the peripheral edge,
   wherein the service opening is configured to allow access to an evaporator blower or a motor located on a rear side of the bulkhead from a front side of the bulkhead through the service opening without removing the evaporator blower or the motor,
   wherein the outer panel includes a first L-shaped transition member and a second L-shaped transition member, each of the L-shaped transition members having a top panel angled slightly upward when it extends toward the peripheral edge and a side panel angled from a peripheral portion of the top panel rearwardly toward the service opening, and
   wherein the outer panel further includes a top wall extruding frontwardly from the peripheral edge of the bulkhead that connects the first and second L-shaped transition members.

3. The bulkhead of claim 2, wherein the service opening allows access to an evaporator unit of the TRU provided at an inner side of the bulkhead from an outer side of the bulkhead.

4. The bulkhead of claim 2, wherein the access door includes:
   an inner panel made from a sheet molding compound (SMC) material;
   an outer panel tracking a contour of the inner panel, the outer panel made from the SMC material; and
   a two-part polyurethane foam positioned between the outer panel and the inner panel.

5. The bulkhead of claim 2, wherein an inner panel of the access door tracks a contour of an inner panel of the bulkhead body.

6. The bulkhead of claim 2, wherein the access door is mounted to the bulkhead body by a M6 screw.

7. The bulkhead of claim 2, further comprising a gasket attached between an inner panel of the access door and the bulkhead body to provide an air tight seal against the bulkhead body.

8. A method of servicing a transport refrigeration unit (TRU) that has a bulkhead, wherein the bulkhead includes: an inner panel; an outer panel tracking a contour of the inner panel; and an insulation layer positioned between the inner and outer panels, the method comprising:
   approaching the bulkhead of the TRU that has a peripheral edge; a center portion surrounded by the peripheral edge and offset from a plane defined by the peripheral edge, a service opening defined in the center portion; and an access door that closes the service opening;
   opening the access door to expose the service opening; and
   accessing an evaporator blower or a motor located on a first side of the bulkhead from a second front side of the bulkhead through the service opening without removing the evaporator blow or the motor,
   wherein the outer panel includes a first L-shaped transition member and a second L-shaped transition member, each of the L-shaped transition members having a top panel angled slightly upward when it extends toward the peripheral edge and a side panel angled from a peripheral portion of the top panel rearwardly toward the service opening, and
   wherein the outer panel further includes a top wall extruding frontwardly from the peripheral edge of the bulkhead that connects the first and second L-shaped transition members.

9. The method of servicing a TRU of claim 8, wherein the service opening allows removal and reinstallation of an evaporator blower and a motor of the evaporator unit.

10. A bulkhead for a transport refrigeration unit (TRU), comprising:
    a bulkhead body including a peripheral edge, and a center portion surrounded by the peripheral edge, the center portion being offset from a plane defined by the peripheral edge;
    a service opening defined in a portion of the center portion;
    an access door that closes the service opening;
    a removal shelf located adjacent a lower edge of the service opening, allowing an evaporator blower and motor assembly to slide thereon when the assembly is moved out from or into the service opening;
    an inner panel;
    an outer panel tracking a contour of the inner panel; and
    an insulation layer positioned between the inner and outer panels,
    wherein the removal shelf has an elongate shape and is positioned perpendicular relative to a lower edge of the service opening,
    wherein the outer panel includes a first L-shaped transition member and a second L-shaped transition member, each of the L-shaped transition members having a top panel angled slightly upward when it extends toward the peripheral edge and a side panel angled from a peripheral portion of the top panel rearwardly toward the service opening, and wherein the outer panel further includes a top wall extruding frontwardly from the peripheral edge of the bulkhead that connects the first and second L-shaped transition members.

11. The bulkhead of claim 1, further comprising a removal shelf located adjacent a lower edge of the service opening, allowing an evaporator blower and motor assembly to slide thereon, when the assembly is moved out from or into the service opening.

12. The bulkhead of claim 2, further comprising a removal shelf located adjacent a lower edge of the service opening, allowing an evaporator blower and motor assembly to slide thereon, when the assembly is moved out from or into the service opening.

13. The method of servicing a transport refrigeration unit (TRU) of claim 8, further comprising:
sliding an evaporator blower or a motor of the evaporator unit along a removal shelf from the rear side of the bulkhead toward the front side of the bulkhead; and
moving the evaporator blower or the motor out of the service opening to the front side of the bulkhead without requiring the user to be present on the rear side of the bulkhead.

14. The bulkhead of claim 1, further comprising
an inner panel;
an outer panel tracking a contour of the inner panel; and
an insulation layer positioned between the inner and outer panels,
wherein both the outer and inner panels include a sheet molding compound (SMC) material,
wherein the insulation layer is composed of two-part polyurethane foam, and
wherein the insulating layer is adhered to inner surfaces of both the outer and inner panels, thereby forming a single homogeneous integral article.

15. A bulkhead for a transport refrigeration unit (TRU), comprising:
a peripheral edge;
a center portion surrounded by the peripheral edge, the center portion being offset from a plane defined by the peripheral edge, defining a receiving space between the peripheral edge and the center portion;
a service opening defined in an offset portion of the center portion;
an access door that closes the service opening;
an inner panel;
an outer panel tracking a contour of the inner panel; and
an insulation layer positioned between the inner and outer panels,
wherein the service opening is configured to allow access to an evaporator blower or a motor located on a rear side of the bulkhead from a front side of the bulkhead through the service opening without removing the evaporator blower or the motor,
wherein the receiving space is configured to create an optimal air flow on a front side and a rear side of the bulkhead,
wherein the outer panel includes a first L-shaped transition member and a second L-shaped transition member, each of the L-shaped transition members having a top panel angled slightly upward when it extends toward the peripheral edge and a side panel angled from a peripheral portion of the top panel rearwardly toward the service opening, and
wherein the outer panel further includes a top wall extruding frontwardly from the peripheral edge of the bulkhead that connects the first and second L-shaped transition members.

16. The bulkhead of claim 15, wherein the outer panel includes a further side panel adjacent to the side panel of the first L-shaped transition member, the further side panel being angled rearwardly toward the service opening.

17. A bulkhead for a transport refrigeration unit (TRU), comprising:
a bulkhead body including a peripheral edge, and a center portion surrounded by the peripheral edge, the center portion being offset from a plane defined by the peripheral edge;
a service opening defined in a portion of the center portion;
an access door that closes the service opening;
a removal shelf located adjacent a lower edge of the service opening, allowing an evaporator blower and motor assembly to slide thereon when the assembly is moved out from or into the service opening,
wherein the removal shelf has an elongate shape and is positioned perpendicular relative to a lower edge of the service opening,
wherein a cavity is formed at a lower portion of the access door to receive at least a portion of the removal shelf,
wherein the removal shelf is tapered when the removal shelf extends toward a rear side of the bulkhead, and
wherein the removal shelf includes an installation aperture configured to retain an evaporator coil at a rear side of the bulkhead.

* * * * *